United States Patent [19]

Taylor

[11] Patent Number: 5,271,218

[45] Date of Patent: Dec. 21, 1993

[54] OFF-ENGINE MOUNTING SYSTEM FOR STEAM AND GASEOUS FUEL MANIFOLDS OF MARINE AND INDUSTRIAL GAS TURBINE ENGINES

[75] Inventor: Stephen M. A. Taylor, Mason, Ohio

[73] Assignee: Gerneral Electric Company

[21] Appl. No.: 890,741

[22] Filed: May 28, 1992

[51] Int. Cl.$^5$ .................................................. F02C 7/20
[52] U.S. Cl. ......................................... 60/39.32; 60/739
[58] Field of Search ................ 60/739, 39.31, 39.32, 60/39.465, 39.55

[56] References Cited

U.S. PATENT DOCUMENTS 3,027,715  4/1962  Morris ................................. 60/39.32
3,768,251  10/1973  Camboulives et al. ................. 60/739

Primary Examiner—Richard A. Bertsch
Assistant Examiner—Thomas S. Thorpe
Attorney, Agent, or Firm—Jerome C. Squillaro; James P. Davidson

[57] ABSTRACT

A manifold system for a marine or industrial gas turbine engine, the system being independent of the engine. An annular steam manifold and an annular gaseous fuel manifold are provided transversely surrounding and substantially coaxial with the engine. The manifolds have a plurality of outlets, each connected by a flexible metal hose to its respective one of the engines' fuel nozzles. Each manifold is supported by a pair of stanchions mounted on the engine's foundation assembly and a pair of brackets attached to each stanchion. The brackets provide limited vertical, lateral, axial and tilt adjustments of the manifolds.

16 Claims, 5 Drawing Sheets

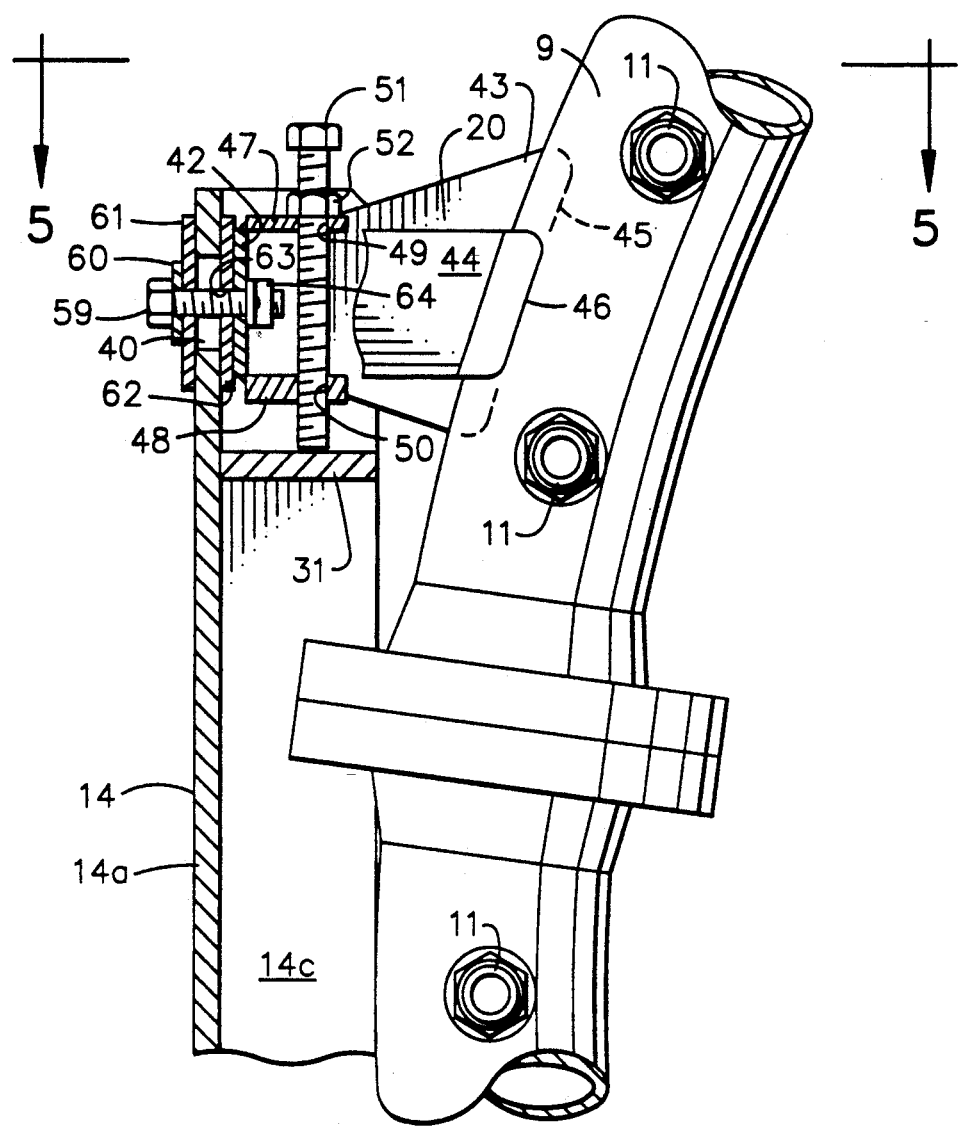
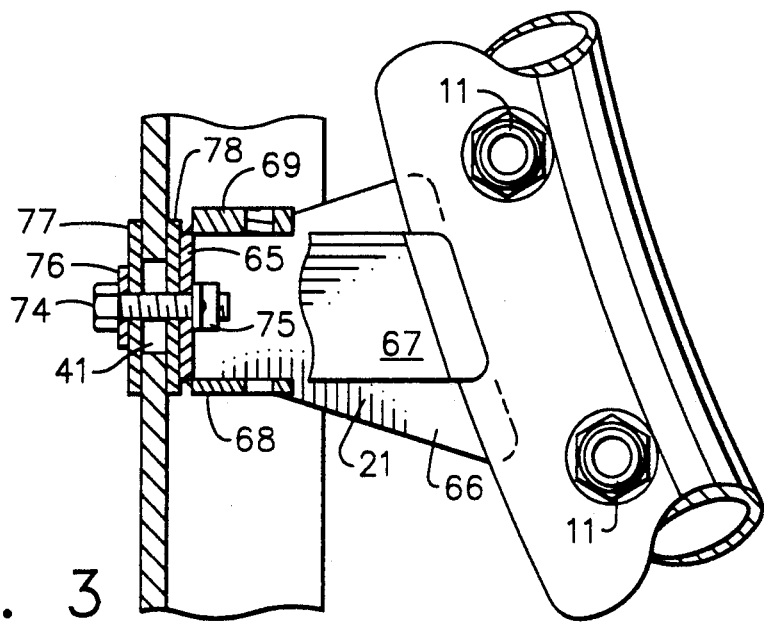
FIG. 3

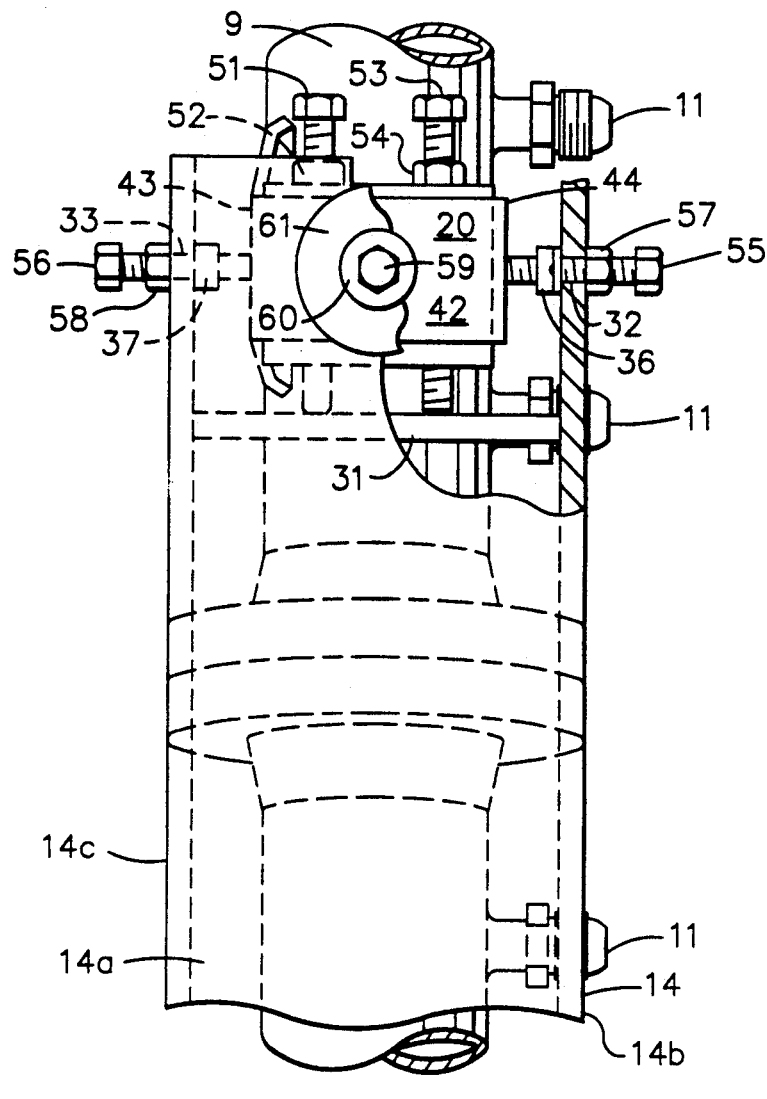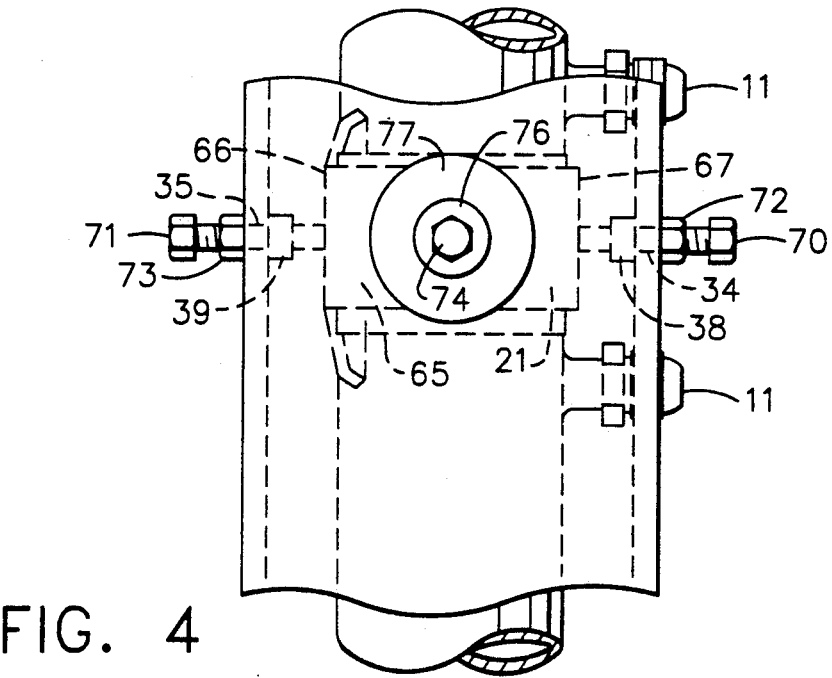
FIG. 4

OFF-ENGINE MOUNTING SYSTEM FOR STEAM AND GASEOUS FUEL MANIFOLDS OF MARINE AND INDUSTRIAL GAS TURBINE ENGINES

TECHNICAL FIELD

The invention relates to a support system for the steam and gaseous fuel manifolds for a gas turbine engine of the marine or industrial type, and more particularly to such a support system which is off-engine.

BACKGROUND ART

While the off-engine manifold support system of the present invention may have other uses, as will be developed further hereinafter, it lends itself particularly well to its application as a support system for steam and gaseous fuel manifolds of marine and industrial gas turbine engines, and will be so described for purposes of an exemplary showing.

It is well established in the prior art that the introduction of steam into the flow path of a gas turbine engine will increase engine performance and reduce emissions. Steam injection increases the mass flow and therefore increases the power output. Furthermore, steam injection just ahead of the combustion reaction zone reduces the amount of oxides of nitrogen generated in the combustion process. Steam injection is particularly applicable to marine and industrial gas turbine engines, which are often located in environments where steam is readily available. Furthermore, the weight of the water and steam generating equipment is not the concern it would be with aircraft engines. According to prior art practice, annular steam and gaseous fuel manifolds are provided, surrounding and substantially coaxial with the gas turbine engine, frequently near the combustor stage thereof. Support for these manifolds has traditionally taken the form of links or braces extending from the engine flanges or fuel nozzle pads. Secondary support has been provided by utilizing rigid supply lines between the manifold outlets and the fuel nozzles.

This prior art support approach for the steam and gaseous fuel manifolds has not been entirely satisfactory. Dynamic and thermal stresses have been a problem and field failures have occured in several areas, manifested by damaged fuel nozzles, broken links, cracks in engine casings, and the like.

The problems were intensified in instances where the gas turbine engine did not have flanges conveniently located for the supporting links. In some instances the links simply would have to be too long to afford adequate support. In other instances, there simply was no flange within reach of a supporting link.

Furthermore, analyses have revealed that the on-engine approach frequently demonstrates resonances in the engine operating range, which could not be moved by fine-tuning the system. Where flanges were so located that extra long links or brackets were required to support the manifolds, the already unacceptable stress levels were compounded.

The present invention is based upon the discovery that these disadvantages can be avoided utilizing an off-engine support approach. The manifolds are each supported by a pair of stanchions mounted on the foundation structure supporting the engine itself. Each stanchion is provided with bracket assemblies which engage its respective manifold, permitting position adjustment thereof. The outlets of the manifolds are connected to their respective nozzles by flexible metal hoses which are not relied upon for manifold support.

As a consequence of this off-engine support, it has been found that the manifolds are dynamically and thermally isolated from the gas turbine engine. The use of the flexible metal hoses results in very low stresses in the fuel nozzles. The approach enables the provision of more precisely positioned customer interfaces, and the off-engine support system of the present invention is characterized by greater simplicity, less maintenance and lower cost than existing support systems.

DISCLOSURE OF THE INVENTION

According to the invention, there is provided a support system for steam and gaseous fuel manifolds for marine and industrial gas turbine engines. The system is characterized by the fact that the manifolds are not supported on the engine, but rather are supported by off-engine elements.

An annular steam manifold and an annual gaseous fuel manifold extend about the engine and are substantially coaxial with the engine axis. Each of the steam and gaseous fuel manifolds is provided with a plurality of outlets arranged thereabout. Each of the outlets of each of the manifolds is connected to a fuel nozzle by a flexible metallic hose. The steam and gaseous fuel manifolds are each provided with an interface for connection to a source of steam and a source of gaseous fuel, respectively.

The gas turbine engine is supported by suitable support members on a foundation assembly. Each of the steam and gaseous fuel manifolds are supported by a pair of stanchions mounted on and extending from the foundation assembly and located to either side of the engine. Each manifold is provided with a pair of brackets for each of its stanchions. The brackets are adjustably attached to their respective stanchion, enabling vertical, forward, aft, lateral and tilt adjustments of the manifolds.

BRIEF DESCRIPTION OF THE DRAWINGS

FIG. 3 is a fragmentary elevational view, partly in cross section, illustrating a stanchion, its pair of brackets, and a portion of a manifold supported thereby.

FIG. 4 is a fragmentary elevational view, partly in cross section, illustrating the structure of FIG. 3 as seen from the left of that Figure.

DETAILED DESCRIPTION OF THE INVENTION

Figure 1:
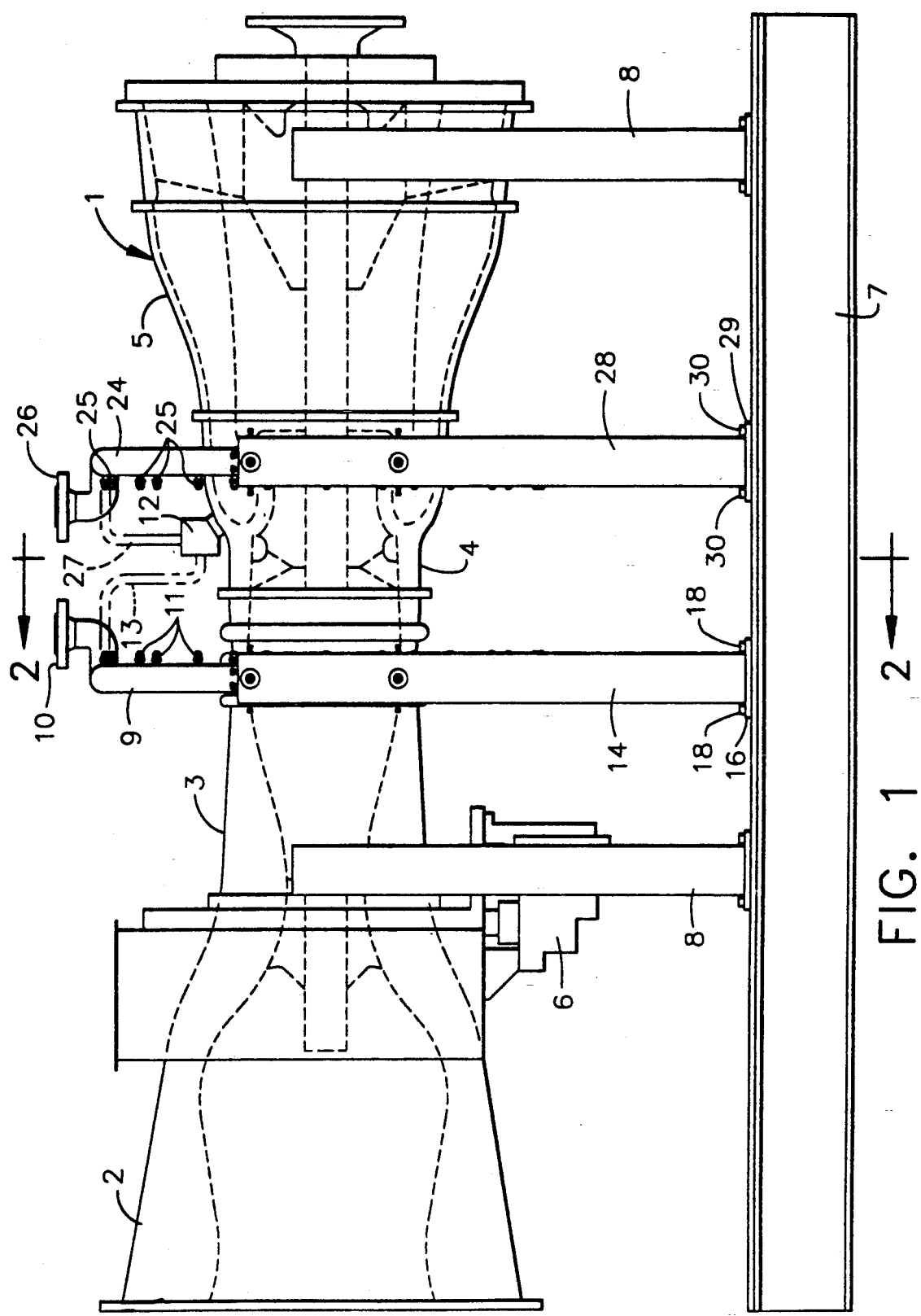
FIG. 1 is a simplified side elevational view of a marine or industrial gas turbine engine provided with the manifold support system of the present invention.

Reference is first made to FIG. 1 which illustrates an exemplary application of the present invention to a marine or industrial gas turbine engine. The engine is generally indicated at 1. Marine and industrial engines are well known in the art. For example, an engine of the type illustrated in FIG. 1 is manufactured by the General Electric Company of Evendale, Ohio, under the designation LM6000.

Briefly, the engine comprises an inlet section 2, a compressor section 3, a combustion section 4 and a turbine section 5. The engine is also provided with an accessory drive 6.

The gas turbine engine 1 is mounted on a suitable foundation or base 7 by means of upstanding support members, two of which are shown at 8.

Figure 2:
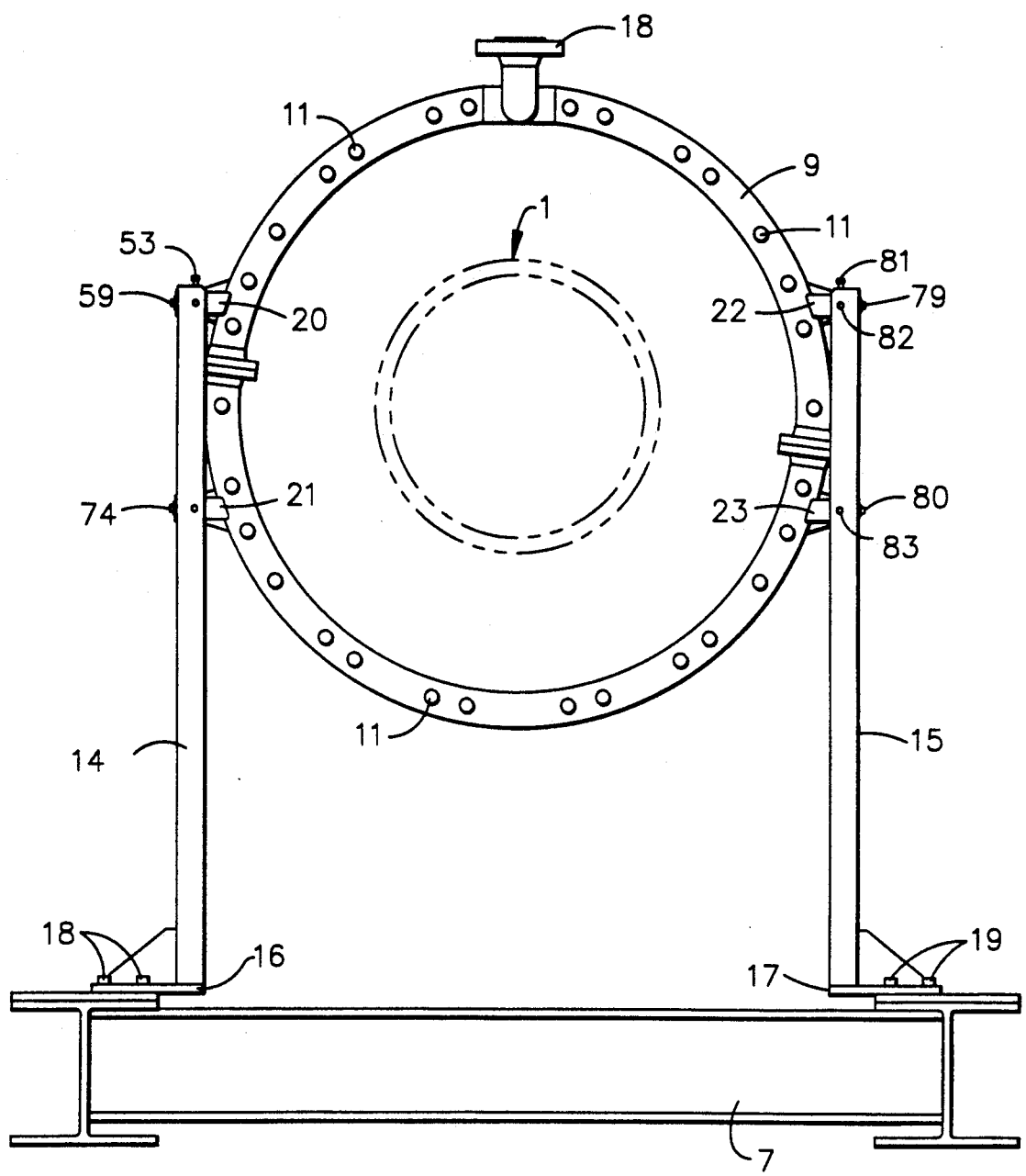
FIG. 2 is a simplified cross sectional view taken along section line 2—2 of FIG. 1.

Reference is now made to FIGS. 1 and 2. The engine 1 is provided with an annular steam manifold 9. The steam manifold 9 is provided with an interface or inlet 10 to be connected to a source of steam (not shown). The steam manifold is provided with a plurality of outlets 11 arranged about the manifold. Each outlet is connected to a fuel nozzle by means of a flexible metallic hose. For purposes of an exemplary showing, one such fuel nozzle is illustrated at 12 in FIG. 1 and the flexible metallic hose therefore is shown in broken lines at 13.

It will be noted that the engine 1 is diagrammatically indicated in FIG. 2 by a pair of concentric broken line circles. The steam manifold 9 surrounds the gas turbine engine 1 and is substantially concentric therewith. The manifold 9 is held in this position by a pair of identical upstanding supports or stanchions 14 and 15. The stanchions 14 and 15 are identical and are each provided with a foot plate 16 and 17, respectively. The foot plates 16 and 17 are appropriately attached to the foundation assembly 7, as by bolts 18 and 19, respectively.

The steam manifold 9 is provided with pairs of brackets 20-21 and 22-23 welded to either side thereof in opposed positions. As will be apparent hereinafter, the brackets 20 and 21 are mirror images of each other. The same is true of brackets 22 and 23. Brackets 20 and 23 are identical, as are brackets 21 and 22.

Returning to FIG. 1, the engine 1 is also provided with a gaseous fuel manifold 24. The gaseous fuel manifold 24 is similar to the steam manifold 9 and is provided with an inlet 26 serving as an interface for connection to a source of gaseous fuel (not shown). The gaseous fuel manifold 24 is provided with a plurality of outlets 25, each of which is connected by a flexible metallic hose to a fuel nozzle. For purposes of an exemplary showing, one of the gaseous fuel manifold outlets 25 is shown connected to the fuel nozzle 12 by a flexible metallic hose shown in broken lines at 27. The remaining outlets 25 will similarly be connected to their respective fuel nozzles. The annular gaseous fuel manifold 24 surrounds and is substantially coaxial with the gas turbine engine 1, and is held in place in the same manner as is the steam manifold 9. To this end, a pair of upright stanchions is provided, one of which is shown in FIG. 1 at 28. The support stanchions for the gaseous fuel manifold 24 are identical to the stanchions 14 and 15 for the steam manifold 9. The stanchion 28 is shown as having a foot 29 attached to foundation 7 by bolts 30. The stanchions for the gaseous fuel manifold 24 will be provided with brackets (not shown) identical to brackets 20-23 of FIG. 2.

Since the stanchion and brackets for the gaseous fuel manifold 24 are substantially identical to those for the steam manifold 9, a description of the stanchions and brackets for the steam manifold should suffice as a description for both. Furthermore, since the stanchion 14 and its brackets 20 and 21 are substantially identical to the stanchion 15 and its brackets 22 and 23, as well as the stanchions and brackets for the gaseous fuel manifold, a description of stanchion 14 and brackets 20 and 21 can stand as a description for all of the manifold stanchions and their respective brackets.

Figure 5:
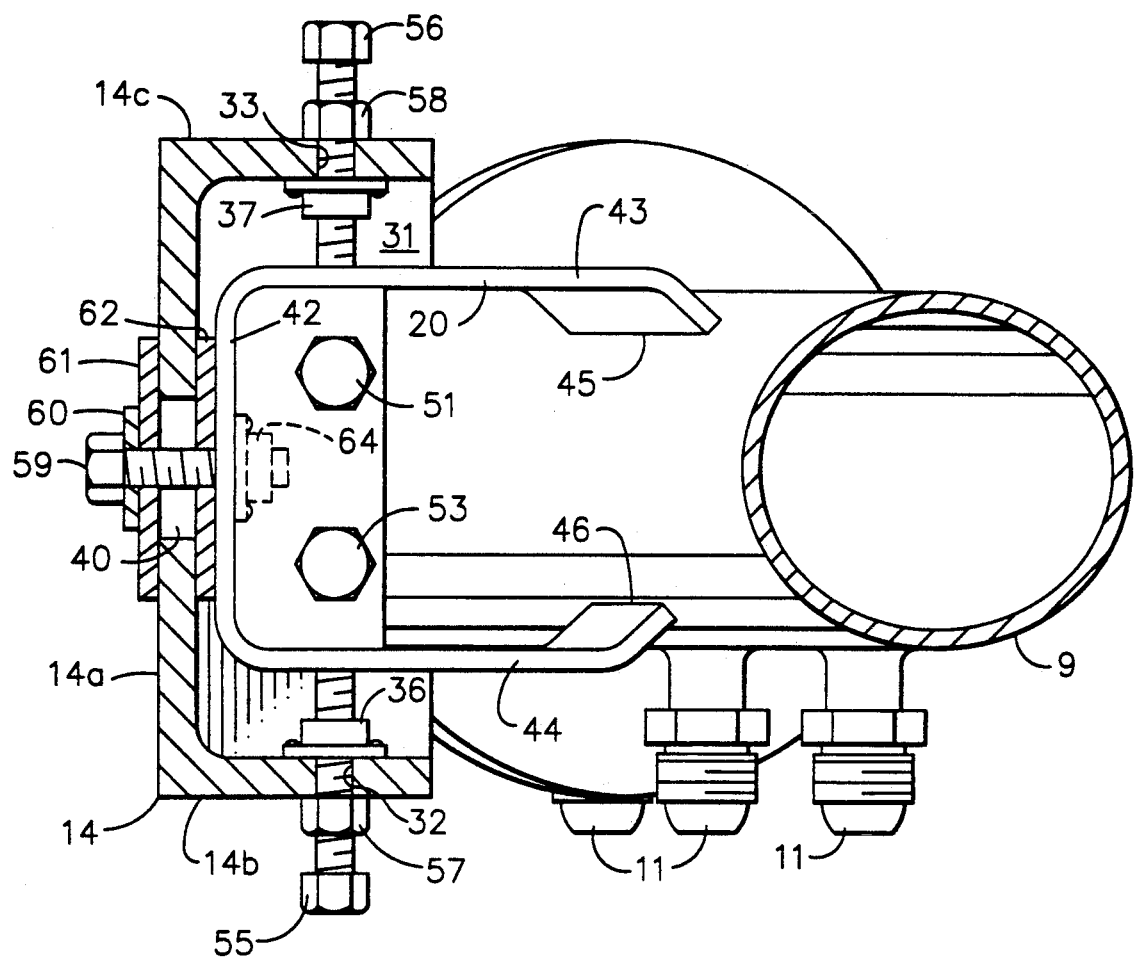
FIG. 5 is a fragmentary cross sectional plan view taken along section line 5—5 of FIG. 3, and illustrating a section through the stanchion thereof.

Reference will next be made to FIGS. 3, 4 and 5. Throughout the Figures, like parts are given like index numerals. As perhaps can best be seen in FIG. 5, the stanchion 14 is an elongated channel member of U-shaped cross section, comprising a base wall 14a and sidewalls 14b and 14c. Near its upper end, the stanchion 14 has a horizontal plate 31 mounted within walls 14a, 14b and 14c and welded thereto. The purpose of plate 31 will be apparent herinafter. Just above plate 31 the stanchion sidewalls 14b and 14c have a pair of coaxial perforations 32 and 33. Further down the stanchion, the stanchion sides 14b and 14c have a similar pair of coaxial perforations 34 and 35. At the position of each of the perforations 32 through 35, inside surfaces of stanchion sidewalls 14b and 14c are provided with riveted-in-place or fixed nuts 36, 37, 38 and 39, respectively. The purpose of the perforations 32 through 35 and the fixed nuts 36 through 39 will be apparent hereinafter. The stanchion 14 is, itself, completed by the provision of enlarged perforations 40 and 41 in its base wall 14a. These perforations are most clearly seen in FIG. 3, and their purpose will be set forth hereinafter.

As indicated above, a pair of brackets 20 and 21 are welded to the manifold 9 and are supported by stanchion 14. The upper bracket 20 comprises a U-shaped member having a base portion 42 and leg portions 43 and 44. Leg portions 43 and 44 terminate in inwardly bent and downwardly and outwardly sloping end portions 45 and 46. The end portions 45 and 46 are welded to the manifold 9 and their slope is such that base portion 42 of bracket 20 is substantially vertical. It will be noted that the leg 43 flares outwardly toward its end portion 45, being wider than the leg 44. This is done for weld loading purposes and to minimize rocking motion of manifold 9.

The bracket 20 has an upper plate 47 and a lower plate 48 welded thereto. The upper plate 47 has a pair of perforations formed therein, one of which is shown at 49. The lower plate 48 has a pair of perforations formed therein, one of which is shown at 50. It will be noted that the lower plate 48 is thicker than the upper 47. This enables the lower plate perforations (one of which is shown at 50) to be threaded.

The pair of perforations 49 and 50 in bracket plates 47 and 48 are adapted to receive a bolt 51. The bolt 51 passes with clearance through perforation 49 and is threadedly engaged in perforation 50 The bolt 51 is provided with a nut 52. The nut 52 cooperates with the threaded perforation 50 to lock the bolt 51 in adjusted position. The other pair of perforations (not shown) in the plates 47 and 48, are identical to the perforations 49 and 50 and accommodate a second bolt 53 and locking nut 54, as shown in FIGS. 4 and 5. It will be understood that the bolts 51 and 53 serve as jack screws and cooperate with the stanchion plate 31 to adjust the vertical height of the steam manifold 9.

As is most clearly shown in FIGS. 4 and 5, the perforations 32 and 33 and their respective nuts 36 and 37, on stanchion sidewalls 14b and 14c are adapted to receive adjustment bolts 55 and 56. The bolt 55 has a lock nut 57 which cooperates with the nut 36 to lock bolt 55 in adjusted position. The bolt 56 is similarly provided with a locking nut 58. The bolt ends abut and engage the sides 43 and 44 of bracket 20 enabling an adjustment of manifold 9 along the axis of the engine 1.

The bracket 20 is attached to stanchion 14 by means of a bolt 59 passing through the perforation 40 in the stanchion base wall 14a. The bolt 59 first passes through a small diameter washer 60 and then a large diameter washer 61. Once having passed through perforation 40, the bolt 59 passes through another larger washer or shim 62 and then through a perforation 63 in the base portion 42 of bracket 20. A riveted-in-place or fixed nut 64 is attached to the inside surface of bracket base portion 42 and is threadedly engaged by the bolt 59.

The perforation 40 in the main wall 14a of stanchion 14 is of an enlarged diameter enabling adjustments to be made by vertical bolts 51 and 53 and side bolts 55 and 56. The enlarged washers 61 and 62 accommodate the enlarged perforation 40 and prevent the head of bolt 59 from passing through perforation 40. One or both of the enlarged washers can be of selected thickness to serve as a shim to make lateral adjustments of the manifold 9.

The bracket 21 is a mirror image of bracket 20 and is otherwise identical, having a base portion 65, leg portions 66 and 67, and plates 68 and 69 similar to the corresponding elements 42, 43, 44, 47 and 48 of bracket 20.

It will be apparent from FIGS. 3 and 4 that the bracket 21 does not support a pair of vertical adjustment bolts or jack screws equivalent to bolts 51 and 53, and there is no plate equivalent to plate 31, adjacent the bracket 21. As a consequence, the bracket 21 is not relied upon to make a vertical adjustment of manifold 9.

The perforations 34 and 35 in stanchion sidewalls 14b and 14c, and their respective nuts 38 and 39 are adapted to accommodate adjustment bolts 70 and 71 provided with lock nuts 72 and 73, respectively. The adjustment bolts 70 and 71 engage the sides 67 and 66, respectively, of the bracket 21 and serve the same purpose as the adjustment bolts 55 and 56 described above. Finally, the bracket 21 is adjustably affixed to the stanchion 14 by bolt 74 passing through stanchion perforation 41 and threadedly engaging the nut 75 riveted to the base portion 65 of bracket 21. The bolt 74 is provided with a small washer 76 and a pair of large washers 77 and 78 equivalent to the washers 60, 61 and 62 respectively, associated with bolt 59.

Referring to FIG. 2, it will be remembered that the bracket 20 and the bracket 23 are identical, as are brackets 21 and 22. The bracket 22 will be provided with the same connecting and adjustment bolts described with respect to bracket 20. Similarly, bracket 23 will be provided with the same mounting and adjustment bolts described with respect to bracket 21.

While there is no rigid procedure which must be followed in the mounting of manifold 9, a first preferred step would be the mounting of bolts 59 and 74 with respect to brackets 20 and 21 and the mounting of the corresponding bolts 79 and 80 of brackets 22 and 23. Next, the vertical positioning of the manifold 9 can be made by means of bolts or jack screws 51 and 53 of bracket 20 and the corresponding bolts of bracket 22, one of which is shown at 81. Thereafter, forward and aft adjustments and/or tilt adjustments may be made by means of the adjustment bolts 55 and 56 of bracket 20 and adjustment bolts 70 and 71 of bracket 21. Similar adjustments can be made by the corresponding bolts for brackets 22 and 23, one each of which is shown at 82 and 83, respectively in FIG. 2. If these last mentioned bolts are used to slightly tilt the manifold 9, additional adjustments may have to be made in at least one of the jack screws, or vertical adjusting bolts of brackets 20 and 22.

The adjustments just described are not intended to be gross adjustments. Rather, they simply enable "fine tuning" of the position of manifold 9. This also enables location of the interface connection of the manifold inlet 10 with greater accuracy. It will be understood that the inlet 10 could be located at any convenient position about the manifold 9.

It will be understood by one skilled in the art the mounting of the gaseous fuel manifold 24 will be identical to that described with respect to steam manifold 9. The stanchions (one of which is shown at 28) for the manifold 24 will be identical to the stanchions 14 and 15 of manifold 9 and manifold 24 will be provided with brackets substantially identical to brackets 20 through 23, operating in the same manner.

Modifications may be made in the invention without departing from the spirit of it. It will be understood by one skilled in the art, for example, that if the engine uses a liquid fuel, a different type of fuel manifold would be required. Nevertheless, the steam manifold 9 might still be used. Furthermore, the engine 1 might be provided with the gaseous fuel manifold 24, but not a steam manifold 9. In other words, the manifold mounting system of the present invention can be utilized when it is desired to provide any appropriate type of annular manifold, anywhere along the engine, susceptible of being mounted in the manner described above. In such an instance, the various advantages described above would still be achieved.

What is claimed is:

1. An off-engine mounting system to support an annular manifold transversely about a marine or industrial gas turbine engine, said mounting system comprising a foundation remote from and fixed with respect to said engine, a pair of stanchions affixed to said foundation and located to either side of said engine, said stanchions being identical, each comprising a channel member having a base wall and side walls and a U-shaped cross section opening toward said manifold, said manifold having in opposed positions thereon a pair of upper and lower brackets for each stanchion, the brackets of each pair being mirror images of each other and bracket pairs being mirror images of each other, each pair of upper and lower brackets being receivable between the side walls of its respective stanchion, each pair of upper and lower brackets being affixed to its respective stanchion to rigidly support said manifold in position about said engine.

2. The mounting system claimed in claim 1 wherein said foundation also comprises the foundation supporting said engine.

3. The mounting system claimed in claim 1 wherein said manifold comprises one of a steam and gaseous fuel manifold, a flexible hose being connected to each manifold outlet.

4. The mounting system claimed in claim 1 wherein said brackets are adjustable with respect to their respective stanchions such that said manifold can be slightly tilted and slightly shifted vertically, axially and transversely with respect to said engine to achieve a final desired adjusted position, and means to rigidly maintain said brackets and thus said manifold in said desired position.

5. The mounting system claimed in claim 4 wherein said manifold comprises one of a steam and gaseous fuel manifold, a flexible hose being connected to each manifold outlet.

6. The mounting system claimed in claim 4 wherein said foundation also comprises the foundation supporting said engine.

7. The mounting system claimed in claim 1 wherein each bracket of each pair comprises a U-shaped member having a base portion and a pair of leg portions, said leg portions of each bracket having free ends welded to said manifold, each bracket being sized to be received within its respective stanchion with ample clearance to be shiftable vertically therein, laterally between said stanchion side walls, and toward and away from said stanchion base wall, each stanchion having a perforation in its base wall for each of the upper and lower brackets of its respective pair, a bolt passing through each of said base wall perforations and through a perforation in said base portion of its respective bracket and provided with a nut to attach said bracket to said stanchion, said perforation in said stanchion base wall having a diameter sufficiently greater than the diameter of said bolt to permit said shifting of said bracket, said bolt having a head and carrying washers preventing said bolt head from passing through said stanchion base wall perforation, said washers also comprising shims to provide limited adjustment of the position of said manifold transversely of said engine, each stanchion having a plate welded within its U-shaped cross section just below said upper bracket of its respective pair, a pair of jack screw means with lock nuts therefor mounted in each of said upper brackets to cooperate with its respective one of said stanchion plates to provide limited adjustment of said manifold vertically with respect to said engine, each stanchion having a pair of adjustment bolts with lock nuts for each bracket of its respective bracket pair, the adjustment bolts of each pair pass through coaxial perforations in the side walls of their respective stanchion and abut the legs of the adjacent bracket enabling limited tilting of said manifold and limited adjustment of said manifold along the axis of said engine.

8. The mounting system claimed in claim 7 wherein said manifold comprises one of a steam and gaseous fuel manifold, a flexible hose being connected to each manifold outlet.

9. The mounting system claimed in claim 7 wherein said foundation also comprises the foundation supporting said engine.

10. An off-engine mounting system to mount an annular steam manifold and an annular gaseous fuel manifold transversely about a marine or industrial gas turbine engine, said mounting system comprising a foundation remote from and fixed with respect to said engine, a pair of stanchions for each of said manifolds affixed to said foundation with the stanchions of each pair located to either side of the engine, the stanchions of each pair being identical, each comprising a channel member having a base wall and side walls and a U-shaped cross section opening toward its respective manifold, each of said manifolds having in opposed positions thereon a pair of upper and lower brackets for each stanchion for that manifold, on each manifold the brackets of each pair being mirror images of each other and bracket pairs being mirror images of each other, each pair of upper and lower brackets on each manifold being receivable between the side walls of its respective stanchion, each pair of upper and lower brackets of each manifold being affixed to its respective stanchion to rigidly support its respective manifold in position about said engine.

11. The mounting system claimed in claim 10 wherein said foundation also comprises the foundation supporting said engine.

12. The mounting system claimed in 10 wherein said annular steam and gaseous fuel manifolds each have the same number of outlets thereabout, a series of fuel nozzles equal in number to the number of outlets of each manifold, a flexible hose connecting each steam manifold outlet to one of said fuel nozzles, and a flexible hose connecting each gaseous fuel manifold outlet to one of said fuel nozzles.

13. The mounting system claimed in claim 10 wherein said brackets of said manifolds are adjustable with respect to their respective stanchions, said manifolds being slightly tiltable and slightly shiftable vertically, axially and transversely with respect to said engine so that each manifold can achieve a final desired adjusted position, and means to maintain said brackets and thus said manifolds in said desired positions.

14. The mounting system claimed in claim 10 wherein on each of said manifolds each bracket of each pair comprises a U-shaped member having a base portion and a pair of leg portions, said leg portions of each bracket having free ends welded to its respective manifold, each bracket being sized to be received within its respective stanchion with ample clearance to be shiftable vertically therein, laterally between said stanchion side walls, and toward and away from said stanchion base wall, each stanchion having a perforation in its base wall for each of the upper and lower brackets of its respective pair, a bolt passing through each of said base wall perforations and through a perforation in said base portion of its respective bracket and provided with a nut to attach said bracket to said stanchion, said perforation in said stanchion base wall having a diameter sufficiently greater than the diameter of said bolt to permit said shifting of its respective bracket, each bolt having a head and carrying washers preventing said bolt head from passing through its respective one of said stanchion base wall perforations, said washers of each bolt also comprising shims to provide limited adjustment of the positions of said manifolds transversely of said engine, each stanchion having a plate welded within its U-shaped cross section just below said upper bracket of its respective pair, a pair of jack screw means with lock nuts therefor mounted in each of said upper brackets to cooperate with its respective one of said stanchion plates to provide limited adjustment of its respective manifold vertically with respect to said engine, each stanchion having a pair of adjustment bolts with lock nuts for each bracket of its respective bracket pair, the adjustment bolts of each pair pass through coaxial perforations in the side walls of their respective stanchion and abut the legs of the adjacent bracket enabling limited tilting of its respective manifold and limited adjustment of said manifold along the axis of said engine.

15. The mounting system claimed in claim 14 wherein said foundation also comprises the foundation supporting said engine.

16. The mounting system claimed in 14 wherein said annular steam and gaseous fuel manifolds each have the same number of outlets thereabout, a series of fuel nozzles equal in number to the number of outlets of each manifold, a flexible hose connecting each steam manifold outlet to one of said fuel nozzles, and a flexible hose connecting each gaseous fuel manifold outlet to one of said fuel nozzles.

* * * * *